United States Patent
Zhang et al.

(10) Patent No.: US 12,556,113 B2
(45) Date of Patent: Feb. 17, 2026

(54) DEVICE AND METHOD FOR MOTOR BRAKING

(71) Applicant: TECHTRONIC CORDLESS GP, Anderson, SC (US)

(72) Inventors: Bao An Zhang, Dongguan (CN); Zi Cong Chen, Dongguan (CN); Li Hua Xie, Dongguan (CN); Chao Wen, Dongguan (CN); Yong Min Li, Dongguan (CN)

(73) Assignee: Techtronic Cordless GP, Anderson, SC (US)

( * ) Notice: Subject to any disclaimer, the term of this patent is extended or adjusted under 35 U.S.C. 154(b) by 217 days.

(21) Appl. No.: 18/264,149

(22) PCT Filed: Feb. 10, 2021

(86) PCT No.: PCT/CN2021/076459
§ 371 (c)(1),
(2) Date: Aug. 3, 2023

(87) PCT Pub. No.: WO2022/170548
PCT Pub. Date: Aug. 18, 2022

(65) Prior Publication Data
US 2024/0088804 A1    Mar. 14, 2024

(51) Int. Cl.
*H02P 3/22*    (2006.01)
(52) U.S. Cl.
CPC ..................... *H02P 3/22* (2013.01)
(58) Field of Classification Search
CPC .............. H02P 3/22; H02P 6/24; H02P 27/08
(Continued)

(56) References Cited

U.S. PATENT DOCUMENTS

| 5,738,177 A | 4/1998 | Schell et al. |
| 6,823,134 B2 | 11/2004 | Glasgow et al. |

(Continued)

FOREIGN PATENT DOCUMENTS

| CN | 103248295 A1 | 8/2013 |
| CN | 103442931 A | 12/2013 |

(Continued)

OTHER PUBLICATIONS

International Search Report and Written Opinion for Application No. PCT/CN2021/076459 dated Nov. 9, 2021 (7 pages).

(Continued)

*Primary Examiner* — Jorge L Carrasquillo
(74) *Attorney, Agent, or Firm* — Michael Best & Friedrich LLP (57) ABSTRACT

Provided is a motor braking device for a N-phase brushless motor. The motor braking device includes a switching circuit adapted to connect the N-phase brushless motor to a power supply, the switching circuit comprising a high side switch group and a low side switch group, each of the high side switch group and the low side switch group comprising N switching elements, and a control unit configured to control the switching circuit to brake the motor based on occurrence of a first event, the first event chosen from a group consisting of release of a trigger by a user, and occurrence of a predetermined condition as detected by a sensor. The control unit is configured to, upon occurrence of the first event, switch all the switching elements of one of the high side switch group or the low side switch group to an on-state, and simultaneously switch all the switching elements of the other one of the high side switch group and the lower side switch group to an off-state.

13 Claims, 10 Drawing Sheets

(58) Field of Classification Search
USPC .......................................................... 318/379
See application file for complete search history.

(56) References Cited

U.S. PATENT DOCUMENTS

| | | | |
|---|---|---|---|
| 7,023,159 B2 | 4/2006 | Gorti et al. | |
| 7,075,257 B2 | 7/2006 | Carrier et al. | |
| 7,688,028 B2 | 3/2010 | Phillips et al. | |
| 7,723,952 B2 | 5/2010 | Phillips et al. | |
| 7,868,591 B2 | 1/2011 | Phillips et al. | |
| 8,587,230 B2 | 11/2013 | Pant et al. | |
| 8,587,231 B2 | 11/2013 | Pant | |
| 9,246,416 B2 | 1/2016 | Ichikawa | |
| 9,438,141 B2 | 9/2016 | Ishikawa et al. | |
| 10,158,301 B2 | 12/2018 | Manasseh et al. | |
| 10,177,691 B2 | 1/2019 | Eshleman et al. | |
| 10,326,385 B2 | 6/2019 | Ichikawa | |
| 10,348,227 B2 | 7/2019 | Ichikawa | |
| 10,478,933 B2 | 11/2019 | Duan | |
| 10,525,579 B2 | 1/2020 | Mashiko et al. | |
| 10,541,622 B2* | 1/2020 | Onda | H02P 27/06 |
| 10,603,777 B2 | 3/2020 | Palich et al. | |
| 10,630,223 B2 | 4/2020 | Yamaguchi et al. | |
| 10,637,372 B2 | 4/2020 | Larsén et al. | |
| 10,666,168 B2 | 5/2020 | Takeda | |
| 10,720,860 B2 | 7/2020 | Westerby et al. | |
| 11,682,988 B2* | 6/2023 | Zheng | H02P 3/14 318/400.01 |
| 2006/0087283 A1 | 4/2006 | Phillips et al. | |
| 2006/0087284 A1 | 4/2006 | Phillips et al. | |
| 2010/0194315 A1 | 8/2010 | Kusakawa et al. | |
| 2012/0019177 A1 | 1/2012 | Kaufmann et al. | |
| 2013/0207581 A1* | 8/2013 | Aoki | H02P 3/22 318/400.21 |
| 2013/0221888 A1* | 8/2013 | Horikoshi | H02P 3/22 318/400.29 |
| 2015/0137717 A1* | 5/2015 | Ishikawa | H02P 3/12 318/379 |
| 2017/0234484 A1 | 8/2017 | Vanko et al. | |
| 2017/0288580 A1 | 10/2017 | Ma et al. | |
| 2017/0288583 A1 | 10/2017 | Ma et al. | |
| 2017/0288584 A1 | 10/2017 | Ma et al. | |
| 2018/0013360 A1* | 1/2018 | Eshleman | H02P 3/22 |
| 2018/0092298 A1 | 4/2018 | Takahashi et al. | |
| 2019/0207539 A1 | 7/2019 | Westerby et al. | |
| 2019/0321961 A1 | 10/2019 | Palich et al. | |
| 2020/0130127 A1 | 4/2020 | Yoshinari et al. | |
| 2020/0180134 A1 | 6/2020 | Palich et al. | |
| 2020/0259429 A1 | 8/2020 | Yoshinari et al. | |
| 2020/0287482 A1 | 9/2020 | Yoneda et al. | |

FOREIGN PATENT DOCUMENTS

| | | |
|---|---|---|
| CN | 104753402 A | 7/2015 |
| CN | 111602330 A | 8/2020 |
| WO | 2019137865 A1 | 7/2019 |
| WO | 2019210790 A1 | 11/2019 |

OTHER PUBLICATIONS

Extended European Search Report for Application No. 21925213.7 dated Sep. 24, 2024 (8 pages).

* cited by examiner

DEVICE AND METHOD FOR MOTOR BRAKING

FIELD OF THE INVENTION

The present invention relates to a device and a method for motor braking. More particularly, the present invention relates to a device and a method for braking a brushless DC (BLDC) electric motor for use in a power tool.

BACKGROUND OF THE INVENTION

A power tool uses an electric motor for operating its function. A brushless DC (BLDC) electric motor is commonly used. The BLDC motor is used as an electric motor when the tool is working. The BLDC motor is used as a generator when the tool is braking. In order to protect the motor and the power tool, the motor brakes if a user releases a trigger switch or the tool triggers anti-kickback or free fall.

The BLDC motor can be difficult to be braked safely and quickly within a short time without substantial damage to the motor. In some cases, extra braking component (e.g., mechanical brakes) is required. Therefore, there is a need for an improved device and method for motor braking.

SUMMARY OF THE INVENTION

In accordance with an embodiment of the present invention, a motor braking device for a N-phase brushless motor, comprises a switching circuit adapted to connect the N-phase brushless motor to a power supply, the switching circuit comprising a high side switch group and a low side switch group, each of the high side switch group and the low side switch group comprising N switching elements, and a control unit configured to control the switching circuit to brake the motor based on occurrence of a first event, the first event chosen from a group consisting of release of a trigger by a user, and occurrence of a predetermined condition as detected by a sensor. The control unit is configured to, upon occurrence of the first event, switch all the switching elements of one of the high side switch group or the low side switch group to an on-state, and simultaneously switch all the switching elements of the other one of the high side switch group and the lower side switch group to an off-state.

The control unit may be further configured to, upon occurrence of a second event occurring after the first event, switch all the switching elements of one of the high side switch group or the low side switch group to the on-state, and simultaneously switch all the switching elements of the other one of the high side switch group and the lower side switch group to the off-state. The switch group switched to the on-state for the second event occurring after the first event, can be the same group as the one switched to the on-state for the first event.

The control unit may be further configured to, upon occurrence of a second event occurring after the first event, switch all the switching elements of one of the high side switch group or the low side switch group to the on-state, and simultaneously switch all the switching elements of the other one of the high side switch group and the lower side switch group to the off-state. The switch group switched to the on-state for the second event occurring after the first event, can be different from the one switched to the on-state for the first event.

In accordance with another embodiment of the present invention, a motor braking device for a N-phase brushless motor, comprises a switching circuit adapted to connect the N-phase brushless motor to a power supply, the switching circuit comprising a high side switch group and a low side switch group, each of the high side switch group and the low side switch group comprising N switching elements, and a control unit configured to control the switching circuit to brake the motor based on occurrence of an event, the event chosen from a group consisting of release of a trigger by a user, or occurrence of a predetermined condition as detected by a sensor. The control unit is configured to, upon occurrence of the event, turn off all the switching elements of the high side switch group and drive all the switching elements of the low side switch group using Power Width Modulation (PWM) control until a speed of the motor drops to a predetermine speed during a first period, and then maintain all the switching elements of the high side switch group in an off-state and drive all the switching elements of the low side switch group to an on-state during a second period.

During the first period, the control unit may be further configured to change a duty cycle during braking such that the duty cycle increases as time goes on.

The control unit may be further configured to change a braking force according to a motor speed such that if the motor speed is higher, the braking force is lower.

The motor braking device may further comprise a capacitor circuit arranged on the input side of the switching circuit. When the power supply is removed from the motor braking device during braking, the control unit can be configured to detect a bus voltage which is higher than a predetermined bus voltage, and to stop braking while being shortly powered by the capacitor circuit.

In accordance with yet another embodiment of the present invention, a motor braking method for a N-phase brushless motor, comprises detecting a first event chosen from a group consisting of release of a trigger by a user, and occurrence of a predetermined condition as detected by a sensor, the trigger being actuated by a user to turn on/off a power supply, and controlling a switching circuit to brake the N-phase brushless motor, the switching circuit being adapted to connect the N-phase brushless motor to the power supply, the switching circuit comprising a high side switch group and a low side switch group, each of the high side switch group and the low side switch group comprising N switching elements. The switching circuit is controlled to brake the motor by switching all the switching elements of one of the high side switch group or the low side switch group to an on-state, and simultaneously switching all the switching elements of the other one of the high side switch group and the lower side switch group to an off-state.

The motor braking method may further comprise detecting a second event occurring after the first event, the second event being chosen from a group consisting of release of a trigger by a user, and occurrence of a predetermined condition as detected by a sensor, and controlling the switching circuit to brake the motor by switching all the switching elements of one of the high side switch group or the low side switch group to the on-state, and simultaneously switching all the switching elements of the other one of the high side switch group and the lower side switch group to the off-state. The switch group switched to the on-state for the second event, can be the same group as the one switched to the on-state for the first event.

The motor braking method may further comprise detecting a second event occurring after the first event, the second event being chosen from a group consisting of release of a trigger by a user, and occurrence of a predetermined condition as detected by a sensor, and controlling the switching circuit to brake the motor by switching all the switching elements of one of the high side switch group or the low side switch group to the on-state, and simultaneously switching all the switching elements of the other one of the high side switch group and the lower side switch group to the off-state. The switch group switched to the on-state for the second event, can be different from the one switched to the on-state for the first event.

In accordance with yet another embodiment of the present invention, a motor braking method for a N-phase brushless motor, comprises detecting a first event chosen from a group consisting of release of a trigger by a user, and occurrence of a predetermined condition as detected by a sensor, the trigger being actuated by a user to turn on/off a power supply, and controlling a switching circuit to brake the N-phase brushless motor, the switching circuit being adapted to connect the N-phase brushless motor to the power supply, the switching circuit comprising a high side switch group and a low side switch group, each of the high side switch group and the low side switch group comprising N switching elements. The switching circuit is controlled to brake the motor by turning off all the switching elements of the high side switch group and driving all the switching elements of the low side switch group using Power Width Modulation (PWM) control until a speed of the motor drops to a predetermine speed during a first period, and then maintaining all the switching elements of the high side switch group in an off-state and driving all the switching elements of the low side switch group to an on-state during a second period.

During the first period, a duty cycle may increase as time goes on.

A braking force can be changed according to a motor speed such that if the motor speed is higher, the braking force is lower.

The motor braking method may further comprise detecting a bus voltage which is higher than a predetermined bus voltage when the power supply is removed during braking, and stopping braking while being shortly powered by a capacitor circuit arranged on the input side of the switching circuit.

According to the present invention, motor braking can be realized safely and quickly without substantial damage to the motor. Also, there is no extra cost for additional components such as mechanical brakes. Provided are several motor braking methods according to the present invention, therefore different methods can be used for different applications applied for different motors and/or power tools.

Other features and aspects of the invention will become apparent by consideration of the following detailed description, drawings and claims.

BRIEF DESCRIPTION OF THE DRAWINGS

These and other features of the invention will become more apparent from the following description, by way of example only, with reference to the accompanying drawings.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Hereinafter, embodiments of the present disclosure will be described in detail with reference to the drawings.

A power tool generally includes a housing which houses a power supply, a motor, a switching circuit and a control unit therein. The power supply can be a battery pack. The power supply does not need to be limited to the battery back, and it should be understood that the power supply can be an AC power source. The motor can be any type of motor such as a brushed motor or a brushless motor. For example, the motor may include a brushless DC (BLDC) electric motor. The BLDC motor can be a N-phase BLDC motor, for example, a three-phase BLDC motor. The three-phase BLDC motor will be described hereinafter for simple explanation. The switching circuit is adapted to connect the motor to the power supply and is configured to apply a braking force to the motor. The switching circuit may include a high side switch group and a low side switch group. For the three-phase BLDC motor, the high side switch group may include three switching elements such as bipolar transistors, field effect transistors (FETs) or insulated gate bipolar transistors (IGBTs). The low side switch group may include three switching elements such as bipolar transistors, field effect transistors (FETs) or insulated gate bipolar transistors (IGBTs).

The control unit is configured to control the switching circuit and the motor. In particular, the control unit is configured to control the switching circuit to apply a braking force to the motor. The power tool also includes a trigger actuated by a user to turn on or turn off the power supply. The trigger can be any kind of input unit such as a switch, a button, or a dial. The control unit controls the switching circuit to brake the motor when the trigger is released by a user (i.e., the tool is turned off by the trigger), or when a predetermined condition is detected by a sensor. The predetermined condition may include an abnormal condition, for example, when the tool needs to trigger anti-kickback or trigger free fall. The control unit controls the switching circuit to brake the motor upon detection of such event.

Figure 1:
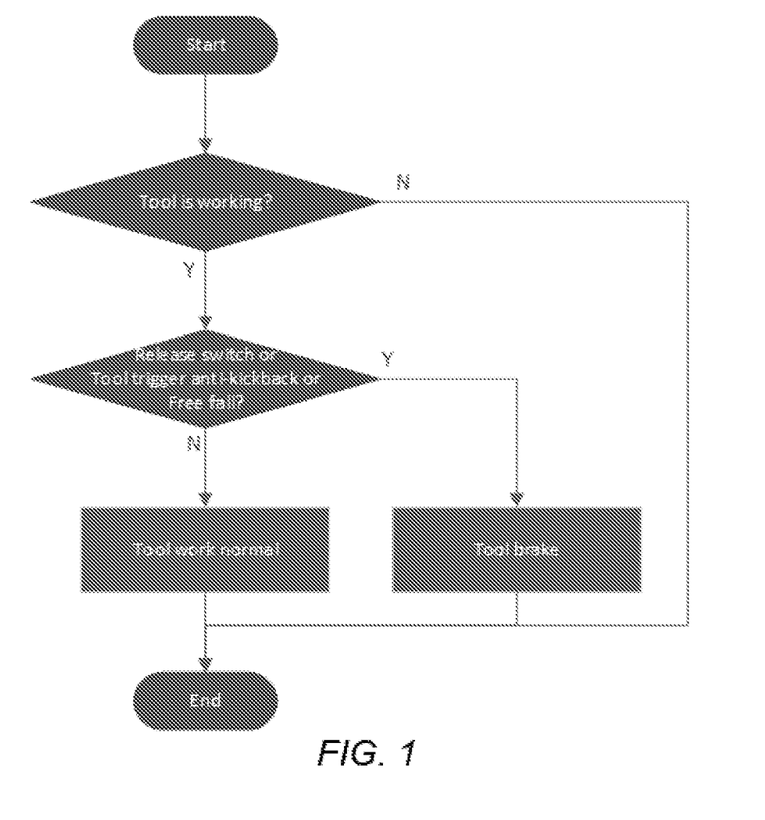
FIG. 1 shows a flowchart of a motor braking method according to an embodiment of the present invention.

FIG. 1 shows a flowchart of a motor braking method according to an embodiment of the present invention.

The power tool operates in a normal condition. If an event such as release of the trigger or a detection of the predetermined condition is occurred, a motor braking method is initiated. When such event is occurred during operation of the BLDC motor, the three phases of BLDC motor can be short-connected to form a closed loop circuit, which generates an induced current and Lorentz force for reverse braking to realize BLDC motor brake. As the resistance of stator winding is very small, the induced current generated will be very large, so according to the situation, Pulse Width Modulation (PWM) can control the size of the induced current, to prevent the large current damage to the switching circuit.

The motor braking method according to the present invention will be described in detail with reference to FIG. 2 hereinafter.

Figure 2:
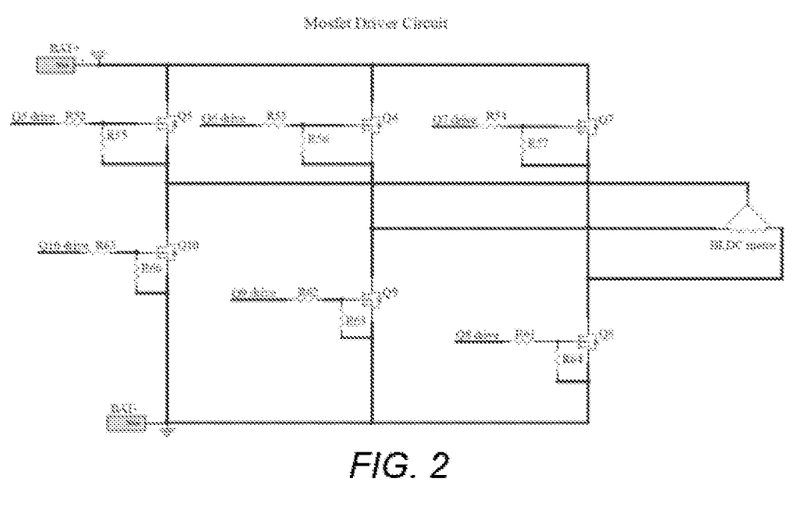
FIG. 2 shows an exemplary circuit diagram of a switching circuit for braking a motor according to an embodiment of the present invention.

FIG. 2 shows an exemplary circuit diagram of a switching circuit for braking a motor according to an embodiment of the present invention.

As shown in FIG. 2, a control unit is arranged to be coupled with a motor (for example, a BLDC motor) via a switching circuit. The switching circuit may include a high side switch group including three high side switching elements (Q5, Q6, Q7) and a low side switch group including three low side switching elements (Q8, Q9, Q10). The high side switch group and the low side switch group can be switched so as to supply the BLDC motor with electrical energy from the power supply. That is, the power supply can be connected to the BLDC motor via the switching circuit.

Figure 3:
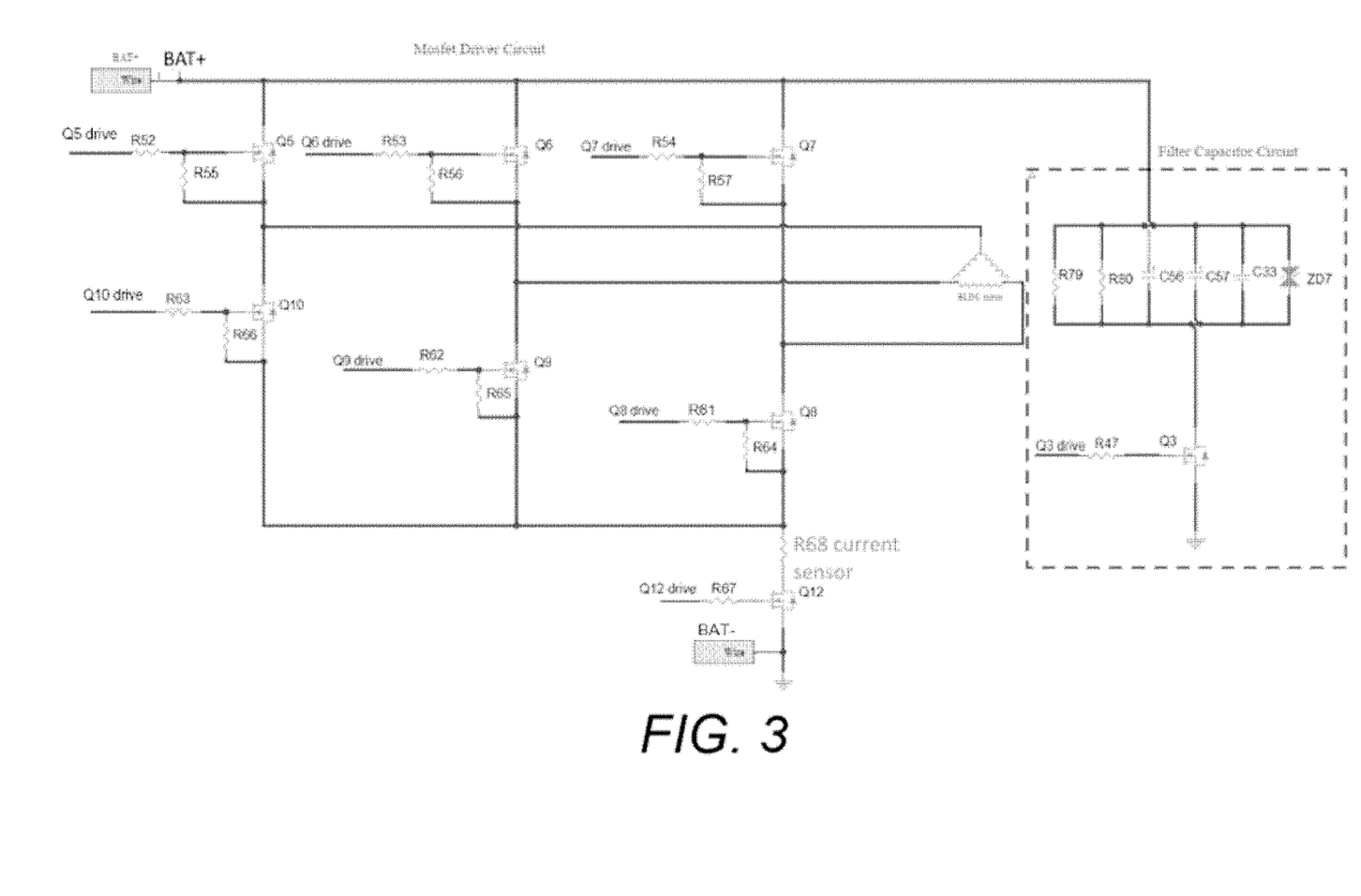
FIG. 3 shows an exemplary circuit diagram of a switching circuit for braking a motor according to another embodiment of the present invention.

FIG. 3 shows an exemplary circuit diagram of a switching circuit for braking a motor according to another embodiment of the present invention. In this embodiment, a filter capacitor circuit can be arranged on the input side of the switching circuit. When the motor is braked and the power supply is removed, the control unit is configured to detect a bus voltage which is higher than a predetermined bus voltage to check if the power supply is indeed removed, and to stop braking while being shortly powered by the capacitor circuit. The bus voltage which is higher than the predetermined bus voltage can mean that the power supply is not receiving regenerated current when the power supply is removed.

The control unit is configured to, upon occurrence of an event (for example, a first event), switch all the switching elements of one of the high side switch group or the low side switch group to an on-state, and simultaneously switch all the switching elements of the other one of the high side switch group and the lower side switch group to an off-state. For example, the event may include release of the trigger. The event may also include a detection of a predetermined condition, which can be occurred when the tool needs to trigger anti-kickback or trigger free fall.

The control unit is further configured to, upon occurrence of another independent event (for example, a second event) occurring after the first event, switch all the switching elements of one of the high side switch group or the low side switch group to the on-state, and simultaneously switch all the switching elements of the other one of the high side switch group and the lower side switch group to the off-state. The second event also may include release of the trigger or a detection of a predetermined condition as described for the first event.

First Embodiment

Figure 4:
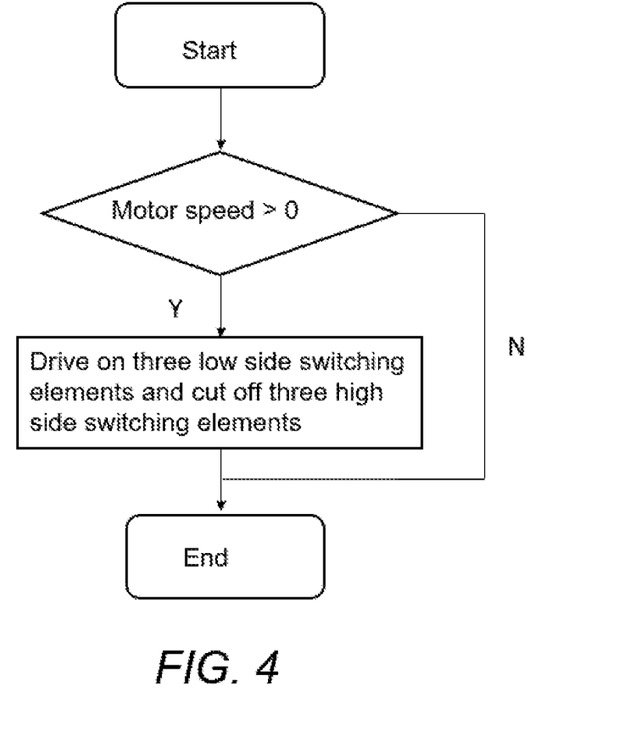
FIG. 4 shows a flowchart of a motor braking method according to a first embodiment of the present invention.
Figure 5:
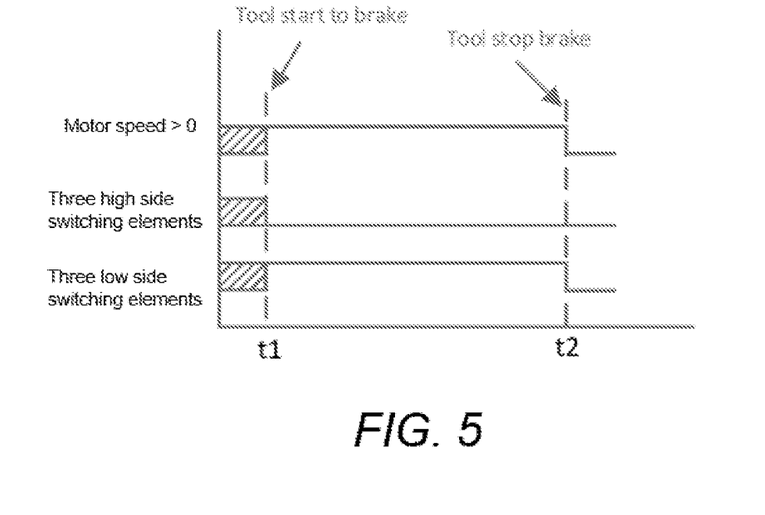
FIG. 5 shows a sequence diagram of a motor braking method according to a first embodiment of the present invention.

According to a first embodiment, the switch group switched to the on-state for the second event occurring after the first event, is the same group as the one switched to the on-state for the previous event, i.e., the first event. FIG. 4 shows a flowchart of a motor braking method according to the first embodiment of the present invention. FIG. 5 shows a sequence diagram of the motor braking method according to the first embodiment of the present invention.

For example, upon occurrence of the first event, the control unit is configured to switch the three low side switching elements (Q8, Q9, Q10) of the low side switch group to the on-state, and simultaneously switch the three high side switching elements (Q5, Q6, Q7) of the high side switch group to the off-state. With reference to FIGS. 4 and 5, upon occurrence of the first event, when the motor speed is higher than 0 at t1, the control unit drives on three lower side switching elements (Q8, Q9, Q10), and simultaneously cuts off the three high side switching elements (Q5, Q6, Q7). Such switching state of the three lower side switching elements (Q8, Q9, Q10) and the three high side switching elements (Q5, Q6, Q7) maintains until the motor speed is 0 at t2.

If another independent event (i.e., second event) triggering the motor brake is occurred after the first event, the control unit is configured to switch the high side switch group and the low side switch group in the same manner as applied to the first event. In other words, the control unit switches the three low side switching elements (Q8, Q9, Q10) of the low side switch group to the on-state, and simultaneously switch the three high side switching elements (Q5, Q6, Q7) of the high side switch group to the off-state. The flowchart as shown in FIG. 4 and the sequence diagram as shown in FIG. 5 can apply for the second event in the same manner.

Second Embodiment

Figure 6:
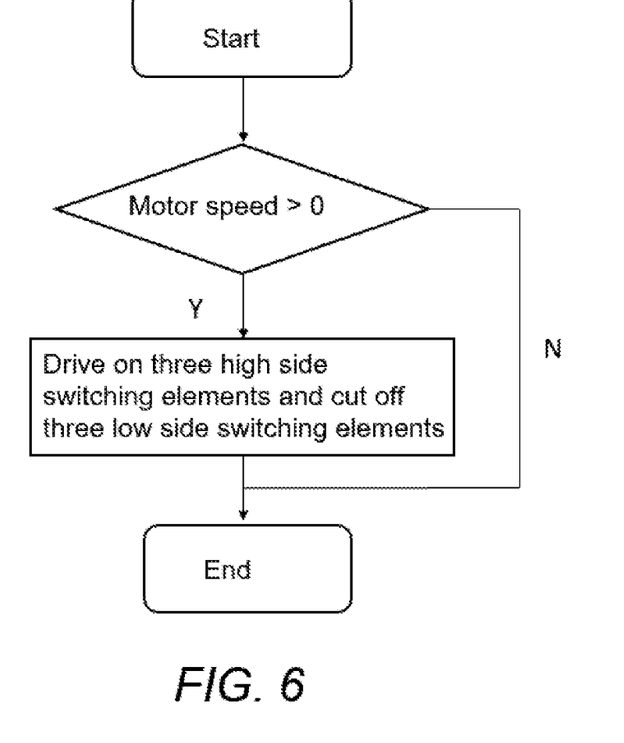
FIG. 6 shows a flowchart of a motor braking method according to a second embodiment of the present invention.
Figure 7:
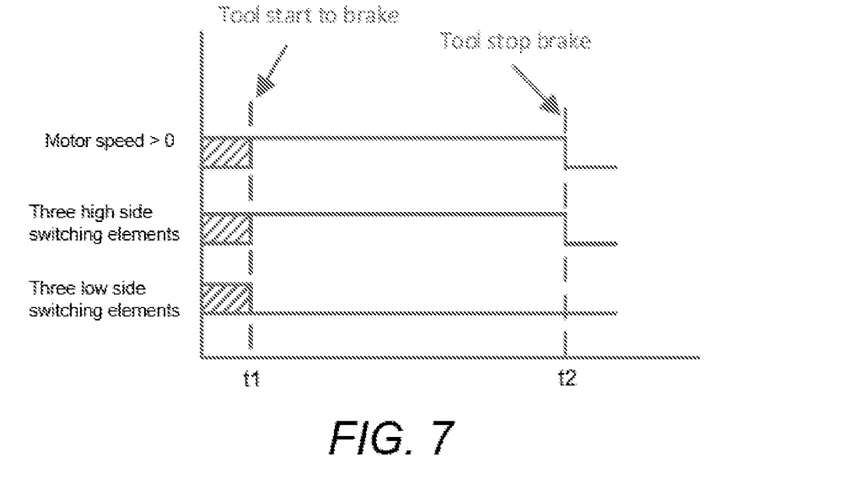
FIG. 7 shows a sequence diagram of a motor braking method according to a second embodiment of the present invention.

According to a second embodiment, the switch group switched to the on-state for the first event and the second event can be the high side switch group instead of the low side switch group. FIG. 6 shows a flowchart of a motor braking method according to the second embodiment of the present invention. FIG. 7 shows a sequence diagram of the motor braking method according to the second embodiment of the present invention.

Upon occurrence of the first event, the control unit is configured to switch the three high side switching elements (Q5, Q6, Q7) of the high side switch group to the on-state, and simultaneously switch the three low side switching elements (Q8, Q9, Q10) of the low side switch group to the off-state. With reference to FIGS. 6 and 7, upon occurrence of the first event, when the motor speed is higher than 0 at t1, the control unit drives on three high side switching elements (Q5, Q6, Q7), and simultaneously cuts off the three low side switching elements (Q8, Q9, Q10). Such switching state of the three low side switching elements (Q8, Q9, Q10) and the three high side switching elements (Q5, Q6, Q7) maintains until the motor speed is 0 at t2.

If a second event triggering the motor brake is occurred after the first event, the control unit is configured to switch the three high side switching elements (Q5, Q6, Q7) of the high side switch group to the on-state, and simultaneously switch the three low side switching elements (Q8, Q9, Q10) of the low side switch group to the off-state. The flowchart as shown in FIG. 6 and the sequence diagram as shown in FIG. 7 can apply for the second event in the same manner.

Third Embodiment

Figure 8:
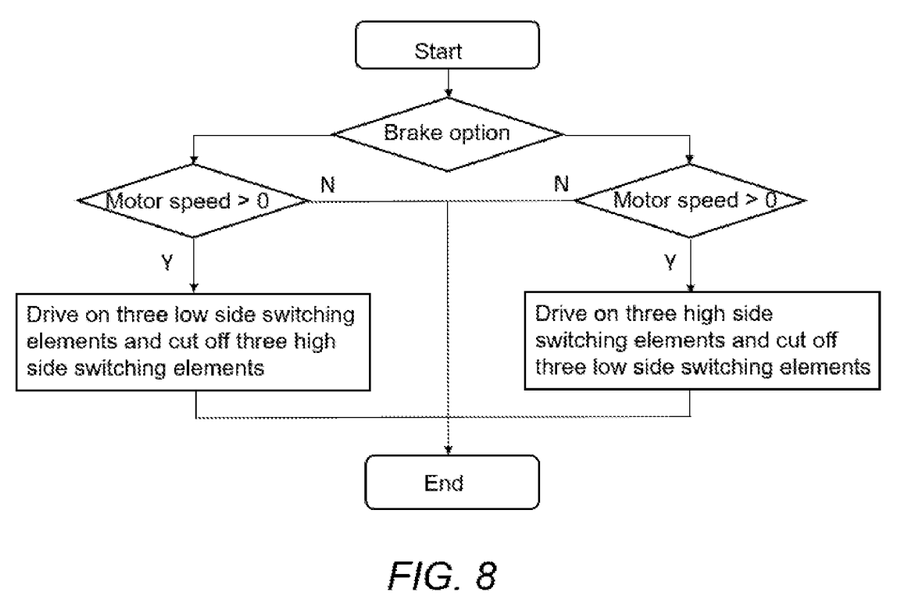
FIG. 8 shows a flowchart of a motor braking method according to a third embodiment of the present invention.
Figure 9:
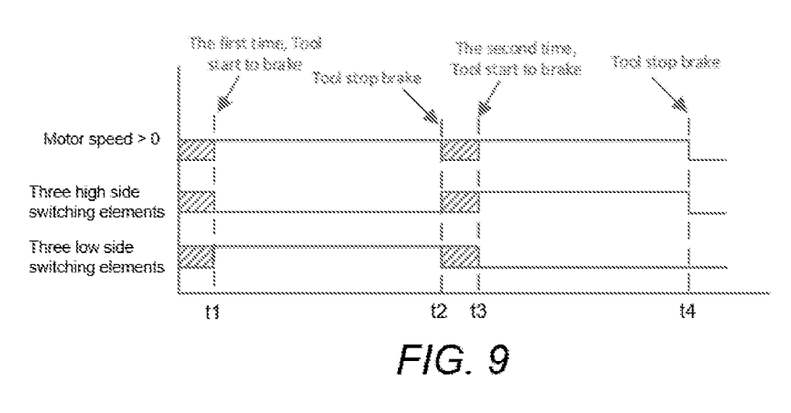
FIG. 9 shows a sequence diagram of a motor braking method according to a third embodiment of the present invention.

According to a third embodiment, the switch group switched to the on-state for the second event occurring after the first event is different from the switch group switched to the on-state for the first event. FIG. 8 shows a flowchart of a motor braking method according to the third embodiment of the present invention. FIG. 9 shows a sequence diagram of the motor braking method according to the third embodiment of the present invention.

For example, upon occurrence of the first event, the control unit is configured to switch the three low side switching elements (Q8, Q9, Q10) of the low side switch group to the on-state, and simultaneously switch the three high side switching elements (Q5, Q6, Q7) of the high side switch group to the off-state. With reference to FIGS. 8 and 9, upon occurrence of the first event, when the motor speed is higher than 0 at t1, the control unit drives on the three low switching (Q8, Q9, Q10), and simultaneously cut off three high side switching elements (Q5, Q6, Q7) until the motor speed is 0 at t2 (the left side of the flowchart in FIG. 8).

If the second event triggering the motor brake is occurred after the first event, when the motor speed is higher than 0 at t3, the control unit drives on the three high switching elements (Q5, Q6, Q7), and simultaneously cut off three low side switching elements (Q8, Q9, Q10) until the motor speed is 0 at t4 (the right side of the flowchart in FIG. 8).

If the switch group switched to the on-state for the first event was the high side switch group, the switch group switched to the on-state for the second event would be the low switch group, which can also belong to this embodiment.

Fourth Embodiment

Figure 10:
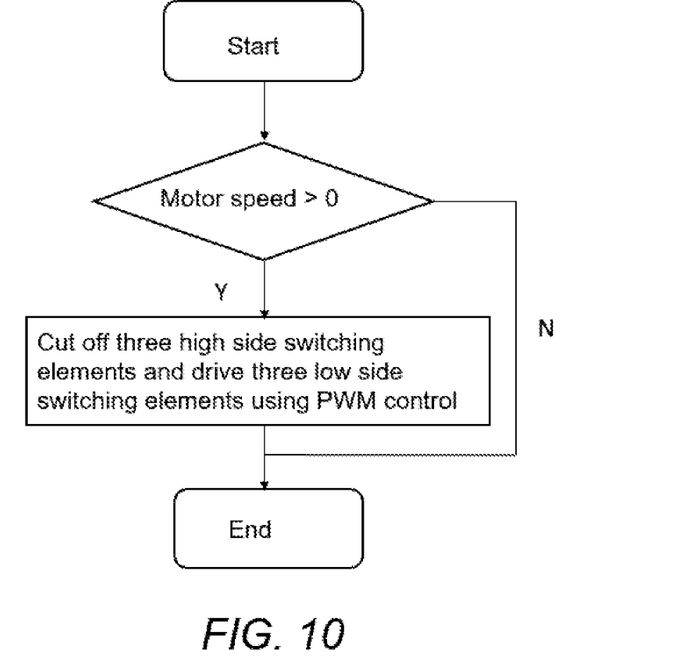
FIG. 10 shows a flowchart of a motor braking method according to a fourth embodiment of the present invention.
Figure 11:
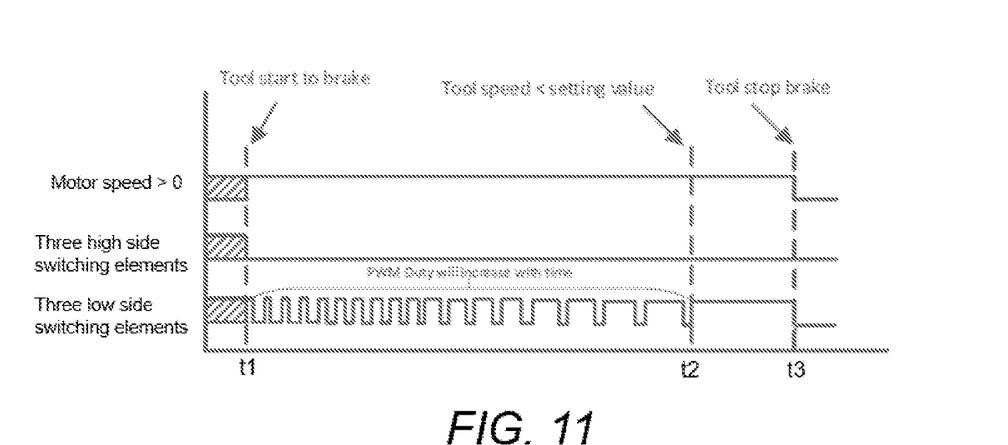
FIG. 11 shows a sequence diagram of a motor braking method according to a fourth embodiment of the present invention.

FIG. 10 shows a flowchart of a motor braking method according to a fourth embodiment of the present invention. FIG. 11 shows a sequence diagram of the motor braking method according to the fourth embodiment of the present invention.

According to the fourth embodiment, upon occurrence of the event, the control unit is configured to turn off all the high side switching elements (Q5, Q6, Q7) of the high side switch group and drive all the low side switching elements (Q8, Q9, Q10) of the low side switch group using PWM control until a speed of the motor drops to a predetermine speed during a first period, and then maintain all the high side switching elements (Q5, Q6, Q7) of the high side switch group in an off-state and drive all the low side switching elements (Q8, Q9, Q10) of the low side switch group to an on-state during a second period.

With reference to FIGS. 10 and 11, upon occurrence of the event, when the motor speed is higher than 0 at t1, the control unit is configured to turn off all the high side switching elements (Q5, Q6, Q7) of the high side switch group and drive all the low side switching elements (Q8, Q9, Q10) of the low side switch group using PWM control until a speed of the motor drops to a predetermined speed at t2. A first period is defined as from t1 to t2. During the first period, PWM duty can increase as time goes on to apply a stronger braking effect. When the motor speed is lower than the predetermined speed at t2, the control unit is configured to maintain all the high side switching elements (Q5, Q6, Q7) of the high side switch group in the off-state and drive all the low side switching elements (Q8, Q9, Q10) of the low side switch group to the on-state until the motor stops at t3. A second period is defined as from t2 to t3. In other words, during the second period, the motor will have a full PWM duty until the motor stops.

Figure 12:
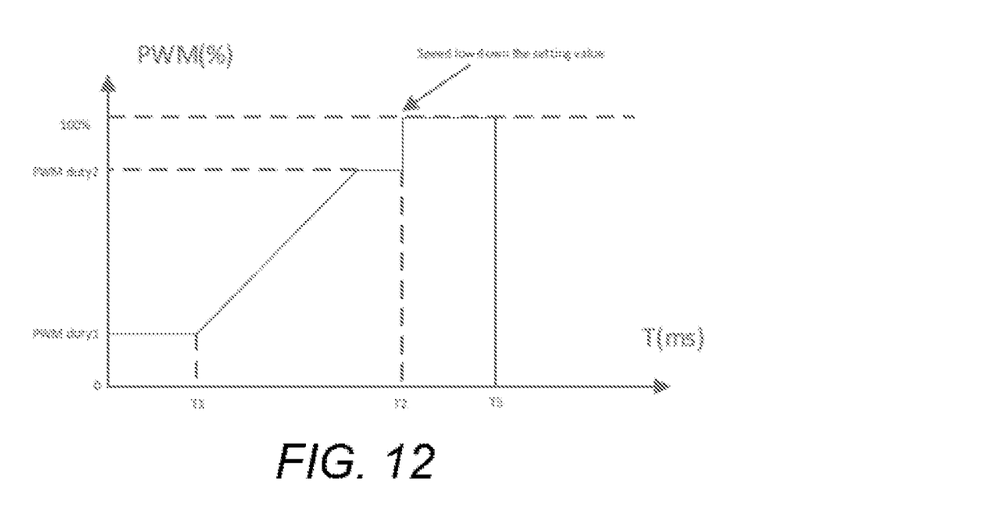
FIG. 12 shows a sequence diagram of a PWM control scheme according to an embodiment of the present invention.
Figure 13:
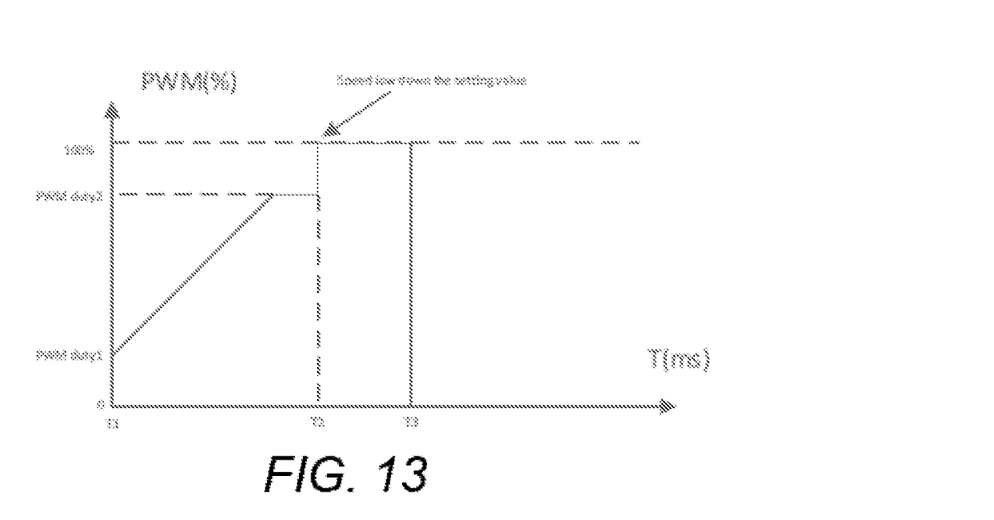
FIG. 13 shows a sequence diagram of a PWM control scheme according to another embodiment of the present invention.
Figure 14:
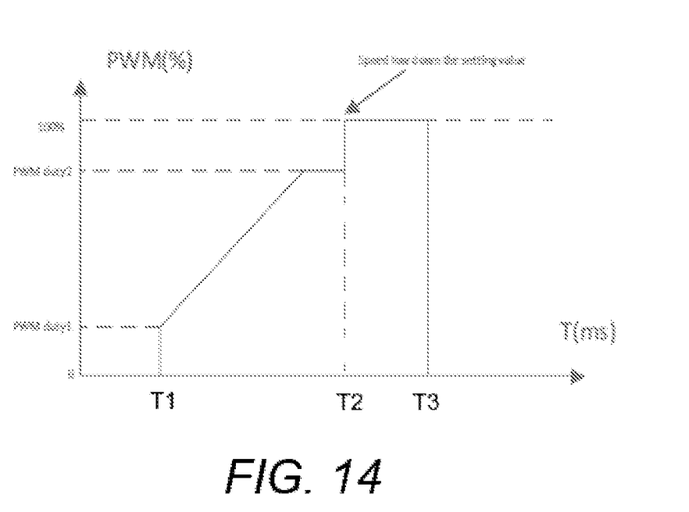
FIG. 14 shows a sequence diagram of a PWM control scheme according to yet another embodiment of the present invention.

For the fourth embodiment, three examples for using PWM control will be described hereinafter. FIGS. 12 to 14 are sequence diagrams showing these three examples respectively.

In a first example (with reference to FIG. 12), when the power tool starts to brake (when t=0), the control unit is configured to turn off all the high side switching elements (Q5, Q6, Q7) of the high side switch group and drive all the low side switching elements (Q8, Q9, Q10) of the low side switch group using PWM control. From when t=0 to when t=T1, PWM duty is a first PWM duty (PWM duty 1). When the motor speed is higher than a first predetermined value at T1, PWM duty starts to increase with time to reach to a second PWM duty (PWM duty 2). When the motor speed is lower than a second predetermined value at T2, PWM duty is 100%. When the power tool stops (i.e., when the motor speed is 0), the tool will cut off its output at T3.

In a second example (with reference to FIG. 13), when the power tool starts to brake (when t=T1=0), the control unit is configured to turn off all the high side switching elements (Q5, Q6, Q7) of the high side switch group and drive all the low side switching elements (Q8, Q9, Q10) of the low side switch group using PWM control. When the motor speed is higher than a first predetermined value at T1, PWM duty increases with time to reach to a second PWM duty (PWM duty 2). When the motor speed is lower than a second predetermined value at T2, PWM duty is 100%. When the power tool stops (i.e., when the motor speed is 0), the tool will cut off its output at T3.

In a third example (with reference to FIG. 14), when the power tool starts to brake (when t=T1=0), the control unit is configured to turn off all the high side switching elements (Q5, Q6, Q7) of the high side switch group and turn off all the low side switching elements (Q8, Q9, Q10) of the low side switch group. When t=T1, the control unit is configured to maintain all the high side switching elements (Q5, Q6, Q7) of the high side switch group to an off-state and drive all the low side switching elements (Q8, Q9, Q10) of the low side switch group using PWM control. When the motor speed is higher than a first predetermined value at T1, PWM duty starts with a first PWM duty (PWM duty 1) and increases with time to reach to a second PWM duty (PWM duty 2). When the motor speed is lower than a second predetermined value at T2, PWM duty is 100%. When the power tool stops (i.e., when the motor speed is 0), the tool will cut off its output at T3.

Figure 15:
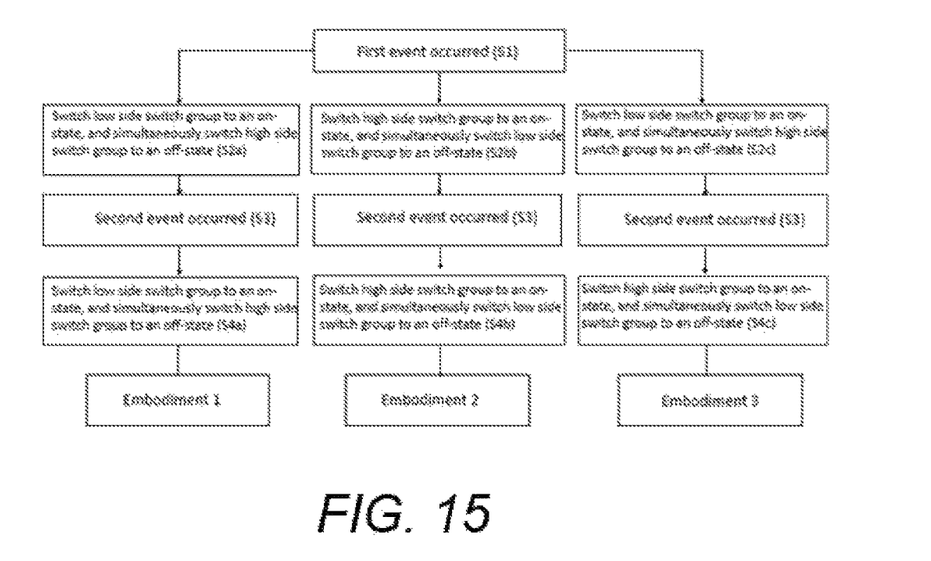
FIG. 15 shows an exemplary motor braking method according to an embodiment of the present invention.

A motor braking method can be described with reference to FIG. 15 which shows the embodiments 1 to 3 according to the present invention.

According to the embodiment 1, upon occurrence of the first event (S1), the control unit is configured to switch all switching elements of the low side switch group to the on-state, and simultaneously switch all switching elements of the high side switch group to the off-state (S2a). If another independent event (i.e., second event) triggering the motor brake is occurred after the first event (S3), the control unit is configured to switch all switching elements of the same group, i.e., the low side switch group to the on-state, and simultaneously switch all switching elements of the high side switch group to the off-state (S4a).

According to the embodiment 2, upon occurrence of the first event (S1), the control unit is configured to switch all switching elements of the high side switch group to the on-state, and simultaneously switch all switching elements of the low side switch group to the off-state (S2b). If the second event is occurred after the first event (S3), the control unit is configured to switch all switching elements of the same group, i.e., the high side switch group to the on-state, and simultaneously switch all switching elements of the low side switch group to the off-state (S4b).

According to the embodiment 3, upon occurrence of the first event (S1), the control unit is configured to switch all switching elements of the low side switch group to the on-state, and simultaneously switch all switching elements of the high side switch group to the off-state (S2c). If the second event is occurred after the first event (S3), the control unit is configured to switch all switching elements of the high side switch group to the on-state, and simultaneously switch all switching elements of the low side switch group to the off-state (S4c). In other words, the switch group switched to the on-state for the second event is different from the one switched to the on-state for the first event.

Figure 16:
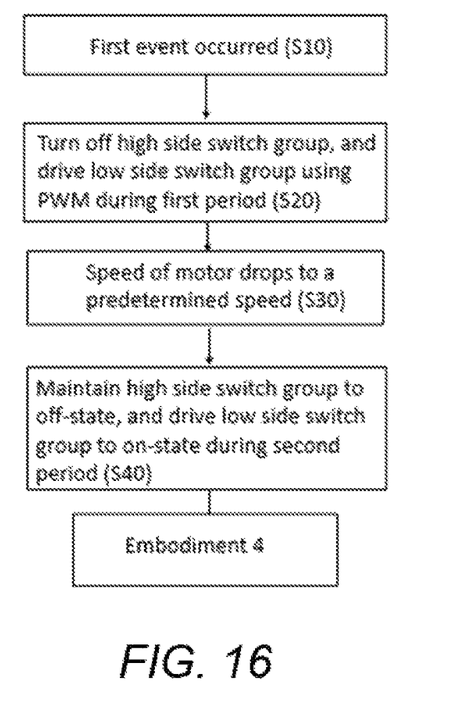
FIG. 16 shows an exemplary motor braking method according to another embodiment of the present invention.

A motor braking method can be described with reference to FIG. 16 which shows the embodiment 4 according to the present invention.

According to the embodiment 4, upon occurrence of the event (S10), the control unit is configured to turn off all the switching elements of the high side switch group and drive all the switching elements of the low side switch group using PWM control during a first period (S20). If a speed of the motor drops to a predetermine speed (S30), and then maintain all the switching elements of the high side switch group in an off-state and drive all the switching elements of the low side switch group to an on-state during a second period (S40).

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided or separately or in any suitable subcombination.

The invention claimed is:

1. A motor braking device for a N-phase brushless motor, comprising:
a switching circuit adapted to connect the N-phase brushless motor to a power supply, the switching circuit comprising a high side switch group and a low side switch group, each of the high side switch group and the low side switch group comprising N switching elements;
a capacitor circuit arranged on an input side of the switching circuit; and
a control unit configured to control the switching circuit to brake the motor based on occurrence of a first event, the first event chosen from a group consisting of release of a trigger by a user, and occurrence of a predetermined condition as detected by a sensor; wherein the control unit is configured to, upon occurrence of the first event, switch all the switching elements of one of the high side switch group or the low side switch group to an on-state, and simultaneously switch all the switching elements of the other one of the high side switch group and the lower side switch group to an off-state; and
wherein when the power supply is removed from the motor braking device during braking, the control unit is configured to detect when a bus voltage is higher than a predetermined bus voltage, and to stop braking while being shortly powered by the capacitor circuit in response.

2. The motor braking device of claim 1, wherein the control unit is further configured to, upon occurrence of a second event occurring after the first event, switch all the switching elements of one of the high side switch group or the low side switch group to the on-state, and simultaneously switch all the switching elements of the other one of the high side switch group and the lower side switch group to the off-state;
wherein the switch group switched to the on-state for the second event occurring after the first event, is the same group as the one switched to the on-state for the first event.

3. The motor braking device of claim 1, wherein the control unit is further configured to, upon occurrence of a second event occurring after the first event, switch all the switching elements of one of the high side switch group or the low side switch group to the on-state, and simultaneously switch all the switching elements of the other one of the high side switch group and the lower side switch group to the off-state, and
wherein the switch group switched to the on-state for the second event occurring after the first event, is different from the one switched to the on-state for the first event.

4. A motor braking device for a N-phase brushless motor, comprising:
a switching circuit adapted to connect the N-phase brushless motor to a power supply, the switching circuit comprising a high side switch group and a low side switch group, each of the high side switch group and the low side switch group comprising N switching elements;
a capacitor circuit arranged on an input side of the switching circuit; and
a control unit configured to control the switching circuit to brake the motor based on occurrence of an event, the event chosen from a group consisting of release of a trigger by a user, or occurrence of a predetermined condition as detected by a sensor;
wherein the control unit is configured to, upon occurrence of the event, turn off all the switching elements of the high side switch group and drive all the switching elements of the low side switch group using Power Width Modulation (PWM) control until a speed of the motor drops to a predetermine speed during a first period, and then maintain all the switching elements of the high side switch group in an off-state and drive all the switching elements of the low side switch group to an on-state during a second period; and wherein when the power supply is removed from the motor braking device during braking, the control unit is configured to detect when a bus voltage is higher than a predetermined bus voltage, and to stop braking while being shortly powered by the capacitor circuit in response.

5. The motor braking device of claim 4, wherein during the first period, the control unit is further configured to change a duty cycle during braking such that the duty cycle increases as time goes on.

6. The motor braking device of claim 4, wherein the control unit is further configured to change a braking force according to a motor speed such that if the motor speed is higher, the braking force is lower.

7. A motor braking method for a N-phase brushless motor, comprising:
   detecting a first event chosen from a group consisting of release of a trigger by a user, and occurrence of a predetermined condition as detected by a sensor, the trigger being actuated by a user to turn on/off a power supply; and
   controlling a switching circuit to brake the N-phase brushless motor, the switching circuit being adapted to connect the N-phase brushless motor to the power supply, the switching circuit comprising a high side switch group and a low side switch group, each of the high side switch group and the low side switch group comprising N switching elements,
   wherein the switching circuit is controlled to brake the motor by switching all the switching elements of one of the high side switch group or the low side switch group to an on-state, and simultaneously switching all the switching elements of the other one of the high side switch group and the lower side switch group to an off-state; and
   wherein when the power supply is removed during braking, the control unit is configured to detect when a bus voltage is higher than a predetermined bus voltage, and to stop braking while being shortly powered by a capacitor circuit in response.

8. The motor braking method of claim 7, further comprising:
   detecting a second event occurring after the first event, the second event being chosen from a group consisting of release of a trigger by a user, and occurrence of a predetermined condition as detected by a sensor;
   controlling the switching circuit to brake the motor by switching all the switching elements of one of the high side switch group or the low side switch group to the on-state, and simultaneously switching all the switching elements of the other one of the high side switch group and the lower side switch group to the off-state,
   wherein the switch group switched to the on-state for the second event, is the same group as the one switched to the on-state for the first event.

9. The motor braking method of claim 7, further comprising:
   detecting a second event occurring after the first event, the second event being chosen from a group consisting of release of a trigger by a user, and occurrence of a predetermined condition as detected by a sensor;
   controlling the switching circuit to brake the motor by switching all the switching elements of one of the high side switch group or the low side switch group to the on-state, and simultaneously switching all the switching elements of the other one of the high side switch group and the lower side switch group to the off-state,
   wherein the switch group switched to the on-state for the second event, is different from the one switched to the on-state for the first event.

10. A motor braking method for a N-phase brushless motor, comprising:
    detecting a first event chosen from a group consisting of release of a trigger by a user, and occurrence of a predetermined condition as detected by a sensor, the trigger being actuated by a user to turn on/off a power supply; and
    controlling a switching circuit to brake the N-phase brushless motor, the switching circuit being adapted to connect the N-phase brushless motor to the power supply, the switching circuit comprising a high side switch group and a low side switch group, each of the high side switch group and the low side switch group comprising N switching elements,
    wherein the switching circuit is controlled to brake the motor by turning off all the switching elements of the high side switch group and driving all the switching elements of the low side switch group using Power Width Modulation (PWM) control until a speed of the motor drops to a predetermine speed during a first period, and then maintaining all the switching elements of the high side switch group in an off-state and driving all the switching elements of the low side switch group to an on-state during a second period; and
    wherein when the power supply is removed during braking, the control unit is configured to detect when a bus voltage is higher than a predetermined bus voltage, and to stop braking while being shortly powered by a capacitor circuit in response.

11. The motor braking method of claim 10, wherein during the first period, a duty cycle increases as time goes on.

12. The motor braking method of claim 10, wherein a braking force is changed according to a motor speed such that if the motor speed is higher, the braking force is lower.

13. The motor braking method of claim 10, further comprising:
    detecting a bus voltage which is higher than a predetermined bus voltage when the power supply is removed during braking, and
    stopping braking while being shortly powered by a capacitor circuit arranged on the input side of the switching circuit.

* * * * *